United States Patent
Grassi (10) Patent No.: US 10,126,565 B2
(45) Date of Patent: Nov. 13, 2018

(54) GLASSES WITH PRISMATIC LENSES

(71) Applicant: FAMILY VISION CENTER—VTE S.R.L., Sesto San Giovanni (IT)

(72) Inventor: Marco Grassi, Sesto San Giovanni (IT)

(73) Assignee: Family Vision Center—VTE S.R.L., Sesto San Giovanni (IT)

( * ) Notice: Subject to any disclaimer, the term of this patent is extended or adjusted under 35 U.S.C. 154(b) by 89 days.

(21) Appl. No.: 15/115,181

(22) PCT Filed: Jan. 26, 2015

(86) PCT No.: PCT/IB2015/050569
§ 371 (c)(1),
(2) Date: Jul. 28, 2016

(87) PCT Pub. No.: WO2015/114504
PCT Pub. Date: Aug. 6, 2015

(65) Prior Publication Data
US 2016/0349533 A1    Dec. 1, 2016

(30) Foreign Application Priority Data

Jan. 28, 2014 (IT) .............................. MI2014A0108

(51) Int. Cl.
| | |
|---|---|
| G02C 7/14 | (2006.01) |
| G02C 1/08 | (2006.01) |
| G02C 5/00 | (2006.01) |
| G02C 5/04 | (2006.01) |
| G02C 3/00 | (2006.01) |

(52) U.S. Cl.
CPC .............. *G02C 1/08* (2013.01); *G02C 5/001* (2013.01); *G02C 5/008* (2013.01); *G02C 5/04* (2013.01); *G02C 7/14* (2013.01); *G02C 3/006* (2013.01); *G02C 2200/16* (2013.01); *G02C 2202/06* (2013.01); *G02C 2202/10* (2013.01)

(58) Field of Classification Search
CPC ................................... G02C 7/02; G02C 7/14
USPC ........... 351/54, 55, 41, 158, 159.17, 159.45, 351/159.58
See application file for complete search history.

(56) References Cited

U.S. PATENT DOCUMENTS

| | | |
|---|---|---|
| 4,787,730 A | 11/1988 | Bristol |
| 5,808,720 A | 9/1998 | Morrison |
| 6,428,165 B1 | 8/2002 | Rivera |
| 2001/0048503 A1 | 12/2001 | Krebs |

(Continued)

FOREIGN PATENT DOCUMENTS

FR            2907557         4/2008

OTHER PUBLICATIONS

Search Report and Written Opinion cited in PCT/IB2015/050569, dated Apr. 23, 2015, 15 pages.

(Continued)

*Primary Examiner* — Hung Dang
(74) *Attorney, Agent, or Firm* — Nixon & Vanderhye P.C.

(57) ABSTRACT

An eyeglass including a first prismatic lens (2), a second prismatic lens (3) and a frame (4) configured to house the first and the second prismatic lenses (2; 3). The first and the second prismatic lenses (2; 3) are low base yoked prisms having a dioptric power, measured in prism diopters, the same for the two lenses and less than 0.25. The first and the second prismatic lenses (2; 3) are oriented in the same direction.

10 Claims, 4 Drawing Sheets

(56) References Cited

U.S. PATENT DOCUMENTS

| | | | |
|---|---|---|---|
| 2008/0259270 A1* | 10/2008 | Shahrarami | G02C 7/14 351/57 |
| 2011/0032477 A1* | 2/2011 | Ohanesian | G02C 7/081 351/159.58 |
| 2011/0194071 A1* | 8/2011 | Cronin | G02C 7/08 351/159.58 |
| 2015/0261012 A1* | 9/2015 | Gottlieb | G02C 7/14 351/159.78 |

OTHER PUBLICATIONS

Eric Matheron et al., "Vertical Phoria and Postural Control in Upright Stance in Healthy Young Subjects", Clinical Neurophysiology, 119 (2008), 2314-2320.

* cited by examiner

GLASSES WITH PRISMATIC LENSES

RELATED APPLICATIONS

This application is the U.S. national phase of International Application PCT/IB2015/050569 filed Jan. 26, 2015 which designated the U.S. and claims priority to Italian patent application MI2014A000108 filed Jan. 28, 2014, the entire contents of these applications are incorporated by reference.

BACKGROUND OF INVENTION

This invention relates to eyeglasses equipped with prismatic lenses. This invention relates particularly to eyeglasses for the visual rehabilitation and/or posture of a patient having for example visual-perceptual problems of orientation and/or space relation, of eyes-teeth-posture of the equilibrium relation along the trigeminal way.

Prisms are known, particularly yoked prisms. In the context of this description two prisms are defined yoked when both prisms are oriented with the bases in the same direction. The known yoked prisms have a dioptric power, generally measured in prism diopters, greater than 0.5. These prisms can be used by special eyeglasses intended to correct disorders and/or problems of spatial orientation, equilibrium-posture and general awareness of the patient wearing them. The eyeglasses equipped with prismatic lenses with dioptric power greater than 0.5, however, have some drawbacks. First of all, they show a considerable thickness which implies a particular discomfort in the assembly of prismatic lenses to the frame and also in the use of eyeglasses. These eyeglasses, if worn over a certain period of time (in the order of minutes), cause secondary effects to the patient wearing them, such as headaches and excessive muscle reactions (overtone), neurovegetative responses (nausea) and spatial distortions with difficulty and insecurity in the stability and gait. This inconvenience limits very much the use of these eyeglasses which, therefore, while having some beneficial effects for the patient who wears them they can be used often with discomfort and in patients with low average stiffness of visual-perceptual organisation and only for short periods of time.

SUMMARY OF INVENTION

An invention has been conceived and disclosed herein to solve one or more of the problems met in the prior art. The invention may be embodied as eyeglasses that, even when worn for long periods, do not entail the side effects and extend the indication of use for patients as per list submitted further down in this description.

These objects and also others, which will be more evident from the following description, are substantially achieved by eyeglasses in accordance with what is expressed in one or more of the appended claims, taken alone or in combination with each other or in combination with any of the other aspects or characteristics described below.

According to one or more aspects of this invention, each of which can be taken alone or in combination with any of the claims or of the other aspects described below, the invention may also relate to eyeglasses in which:
the first and the second prismatic lenses are substantially circular
the frame comprises a first housing seat configured for, and intended for, housing the first prismatic lens and a second housing seat configured for, and intended for, housing the second prismatic lens;
the first and the second housing seats are substantially circular;
the first and the second prismatic lenses are low base yoked prisms;
the first and the second prismatic lenses having a same orientation and/or angular position, respectively, with respect to the first and the second graduated portions of the frame;
the front surface and the rear surface of the prismatic lenses are substantially circular;
the first and the second prismatic lenses have a variable thickness, in particular linearly, between a first thickness defined at a first portion of the prismatic lenses and a second thickness defined at a second portion of the prismatic lenses, the first thickness being greater with respect to the second thickness;
the first thickness is defined at the first portion of the prismatic lenses, the first portion of the prismatic lenses being defined at the lower portion of the frame;
the second thickness is defined at the second portion of the prismatic lenses, the second portion of the prismatic lenses being defined at the upper portion of the frame;
the first and the second prismatic lenses are yoked rotatable prisms;
the first and the second prismatic lenses are mounted on the frame respectively at the first and at the second housing seats, the first portion of the prismatic lenses being mounted at the lower portion of the frame and the second portion of the prismatic lenses being mounted at the upper portion of the frame;
the first and the second reference indicators are defined at the front or the rear surface, respectively, of the first and the second prismatic lenses;
the first and the second reference indicators have a same angular position respectively with respect to the first and to the second graduated portions of the frame;
the first and the second graduated portions are defined at the rear surface of the frame;
the regulating mechanism comprises a screw mechanism;
the frame is elastically deformable at least at a portion interposed between the first and the second housing seats;
the first and the second housings seat comprise, respectively, a first and a second grooved seats intended to house, respectively, the first and the second prismatic lenses;
the first and the second grooved seats develop circumferentially in an inner portion of the frame defined at the first and the second housing seats;
the first and the second prismatic lenses have a section of the side surface in a circumferential development substantially at "V";
the first and the second grooved seats, respectively, comprise a first and a second circumferential recesses;
the first and the second circumferential recesses are counter-shaped with respect to the circumferential section substantially at "V" of the side surface in a circumferential development of the prismatic lenses;
the frame comprises a central portion, a first and a second end portion reciprocally opposite with reference to the central portion of the frame, the first and the second prismatic lenses developing in interposition between the first and the second end portions at the central portion of the frame;
the eyeglasses comprise a first and a second support rods extending in a direction substantially parallel to, and operatively connected to, the frame respectively at the first and the second end portions of the frame;

the first and the second support rods comprise an end portion at least partially curved and a mounting portion opposite to the end portion, the first and the second support rods being operatively connected respectively to the first and the second end portions of the frame at the respective mounting portions;

the first and the second support rods are hinged to the frame at the respective mounting portion;

the eyeglasses comprise a joint at least partially elastic operatively connected to the frame, the joint being housed with at least one first opening and at least one second opening of the frame defined respectively at the first and the second end portions of the frame.

SUMMARY OF DRAWINGS

Now, by way of example and not limited, is given the detailed description of one or more preferred embodiments of the invention, wherein.

DETAILED DESCRIPTION OF INVENTION

With reference to the Figures, 1 generally indicates a pair of eyeglasses in accordance with this invention comprising two prismatic lenses. Preferably, the eyeglasses in accordance with this invention comprise two yoked rotatable prismatic lenses. In the context of this description for yoked lenses, or yoked prisms, are intended prismatic lenses having their respective major bases, or increased thickness portions, oriented in the same direction, while for rotatable prismatic lenses, or rotatable prisms, are intended lenses the angular position of which can be adjusted and/or modulated relative to the frame of the eyeglasses.)

The eyeglasses in accordance with this invention can be used in a method of assessment and in a treatment of visual rehabilitation aimed to reduce the visual-perceptual interference which, through the trigeminal way, harmonises the relation between eyes, teeth and posture. The trigeminal way develops substantially along the trigeminal nerve. This method is based essentially on a specific visual and behavioural functional assessment with interdisciplinary approach. As far as rehabilitation is concerned, it also requires the use of yoked prismatic lenses of very low dioptric power, or micro-prisms, in accordance with what is explained below, arranged in low base to raise awareness of the environmental-peripheral visual information as further support to the relationship with space. In the context of this description, by yoked Micro-Prisms™ is intended the trade name used by the Applicant to distinguish these prismatic lenses. In the context of this description, by yoked prismatic lenses in low base are intended prisms having their respective major bases, or increased thickness portions, arranged at the lower portion of the frame and/or of the eyeglasses. In general, the low base prisms divert the light downward, resulting in a diffusion of the image more open to the outside and better distributed over the peripheral retinal areas of the patient with the effect of changing the perception of the objects and increase that of the environment. The typical response is a low density or muscular relaxation so as to induce the patient to assume greater environmental awareness and a better spatial relationship with more upright posture and balance. This response is consequent to stimulation of the peripheral retinal areas of the patient; in fact, the nerve fibres coming from the peripheral retina (approximately 18% of all retinal fibres) travel towards the midbrain to provide processing related to spatial orientation, general awareness, equilibrium-posture, motion perception, anticipation of change.

In detail, the method improves the sensory modality of the relationship between the various muscular systems through the following actions: destructuring, re-programming and rehabilitating, from the eye muscles (ocular motility), to balance the tension of the muscle chains and balance the unique relation between the eyes (visual receptor), teeth (stomatognathic receptor) and atlas/occiput (postural receptor). Basically, the method is aimed at reducing the visual-perceptual stiffness, through the greater peripheral-environment awareness, and the relaxation of the muscular tensions that affect the postural order. The yoked rotatable prismatic lenses used in the method have a dioptric power, measured in prism diopters, less than 0.25, particularly between 0.05 and 0.24. These lenses substantially induce a new visual processing in the patient wearing eyeglasses in accordance with this invention; this new visual processing involves a new perceptual organisation in the patient. The method utilising the above eyeglasses equipped with prismatic lenses is applied for example for patients with:

problems of orientation and spatial relationship with instability and insecurity in walking;

headache, muscular tension at the base of the neck, instability or dizziness when standing or even when sitting, jaw clamping when associated with visual-cognitive tasks such as reading, studying, working, monitor applications on electronic systems;

unstable fixation with eye movements little fluid and below school or work needs;

difficulties or lack of binocular coordination in the simultaneous management of information coming from the two receptors eye;

binocular coordination difficulties associated with alteration of the correct kinematics of the temporomandibular joint or forced palatal expansion;

amblyopia (lazy eye) from ametropia or functional with impaired visual quality, spatial perceptual discrepancy and disharmonious sensorial integration between the two eyes, with reduction of the stereoscopic sense and modified assessment of distances and space, often perceived two-dimensional;

distorted spatial localisation with respect to the real position of objects in space that induces tension in the anterior muscular chain with postural changes;

reduction of peripheral and environmental awareness, basic in the movements, in stable walking, in avoiding obstacles or side objects and in setting the trajectory of a curve when driving cars, bicycles, motorcycles;

difficulties in the integration of central visual information or foveal with those environmental or peripheral;

difficulties in the integration of visual information with those coming from other senses: ability to perform multiple tasks simultaneously (multi-tasking);

stress or functional deterioration of vision with reduction, with/without association of one or more points of the three previously listed, of the visual or perceptual performance due to intense and sustained proximal application (reading, studying, working or activities on the monitor of the electronic processing systems).

The method can also be applied:

in the rehabilitation of the fixation disparity for the achievement of a central fixation;

in the Neuro-Optometric rehabilitation of post trauma with difficulties in the integration of visual-spatial information with those coming from the other receptors: spatial disorientation with impaired spatial localisation, walking instability, abnormal posture, difficulty in following with the eyes and reading, tilting and rotation of the head, diplopia, (PTVS: Post Trauma Vision Syndrome);

in the reprogramming of the lingual posture;

in the optimisation of visual efficiency such as the foundation of sports performances;

in the presence of sounds in auditory level;

as a preventive method to the deterioration of visual and perception performance and the onset of muscular tensions and postural changes, for example during the progress of the course of study and work, in the prevention and treatment of functional/behavioural myopias and scoliosis attitudes from positions usually incorrect at school or office desk;

during the procedures of visual functional re-education through fixing activities of fixation, oculomotor, accommodative, fusional, binocular, proprioceptive and multisensory integration The method can also be applied to:

patients with impaired postural scars;

patients with postural change by piercing;

patients with response of the neurovegetative and/or visceral type following strenuous integration of central visual information with the environmental, such as, for example, in shopping centres, means of transport; open space, driving in traffic and road tunnels, confined or closed space;

patients with difficulty adapting to eyeglasses with progressive or multifocal lenses;

musician patients, to reduce muscular tension and pressure of the fingers on the strings or keys, especially in asymmetric musical instruments;

patients with misalignment of the visual mid, vertical and/or horizontal line as a result of whipping with difficulty in posture, equilibrium and coordination; who, in the upright position, have anterior-posterior and/or lateral inclination, disorientation and spatial distortion, insecurity in the peripheral-environmental awareness. And in addition, patients with reduced speed of the pursuit movements and speed of reading, patients with VMSS (Visual Midline Shift Syndrome);

elderly patients to improve the stability of eye movements, motor coordination, stability of general movements, hand-eye coordination, safety in gait such as consequences of altered certainty in the environmental visual and spatial orientation perception, also essential for the safety in driving.

The method also finds particular application in preschool and school age and in adults, in the following cases:

poor general motor coordination;

in the prevention and treatment of difficulties in learning related to visual dysfunction (patients without SLD: Specific Learning Disorder);

for destructuring a close posture during the visual-cognitive commitments;

reading not at the level of school request or of expectations;

loss of the line when reading or copying with confusion, jumps and omission of letters or words;

hypertone that inhibits the fluidity of ocular motility and activates the head movement while reading at the detriment of smoothness of the function itself and the understanding of the text;

reduced periods of visual attention;

difficulty of comprehension in reading;

difficulty in grasping or hit the ball, lacking spatial perception and/or hand-eye coordination;

patients with visual dysfunction and with specific learning disorder (SLD), in agreement with the figure of speech therapist.

In order to assess whether the subject under examination is likely to use eyeglasses with prismatic lenses in accordance with this invention, the optometric behavioural approaches is followed, which considers the visual system as a dynamic process interacting with all the other information processing systems and motor and sensorial functions (kinesthetic, proprioceptive, tactile, auditory, vestibular); this approach takes into consideration the conduct, posture, environment in which the subject lives, studies and works. The assessment of the subject's suitability consists of a first, a second and a third phase. The first phase consists in the collection of information about the patient's medical history (anamnesis), particularly by means of specific questions directed to the patient, while the second phase consists essentially in the collection of optometric data relating to the patient and includes particularly a series of tests to investigate his visual abilities. Finally, the third phase consists in the observation and in the analysis of the patient from the point of view of his relation, localisation and spatial orientation, of his coordination and his posture by means of a series of analyses, tests and/or activities that will be described below. The three phases will be described below in more detail.

The patient's medical history (anamnesis) collection includes the collection of most of the information related to the history of the patient, including:

evolution of visual applications (study, work, computer equipment), use of visual corrections, quality and comprehension of reading;

evolution of the dental apparatus, the position of the tongue, the state of the temporal-mandibular joint, the use of orthodontic appliances;

posture assumed or induced during the visual and cognitive tasks such as studying, working and applications with computer apparatuses;

the characteristics related to the environment in which the patient studies, works or spends most of his time;

foot support;

presence of traumas on the head, at the cervical base (whiplash) and neurological damages.

As regards the second phase, it takes place with the patient in a sitting position and uses the application of the Optometric Analytical Sequence, which is a battery of tests developed and concatenated according to the OEP (Optometric Extension Programme) analytical sequence of the relation between accommodation (identification activities or focus) and convergence (localisation activities). In other words, the Optometric Analytical Sequence of the visual function is a battery of clinical data (defined as scientific) that allows to accurately predicting the visual performance through daily life. The main proposals of the Optometric Analytical Sequence can be summarised in three points: to allow the optometrist to interpret and asses the visual performance of the examined subject during many daily visual conditions that may occur to him, allowing to obtain information on the functional visual state that are not determinable by other methods and that do not consider the common trigeminal way between the visual receptor, the stomatognathic receptor and the postural receptor and finally determine the visual values that the assessed subject can use comfortably and even for preventive purpose and remedially, besides for rehabilitation or compensatory purpose.

The Analytical Sequence of the visual function is always preceded by a preliminary optometric assessment that includes a series of tests to investigate the visual skills, as described below, and the binocular vision state by giving preference to the qualitative and quantitative state and a series of behavioural observations in addition to the preliminary medical history (anamnesis) interview. The visual skills are a group of neuromuscular activities and are: ability to fixation, ocular motility and pursuit, focusing or identification, convergence or localisation, binocular fusion and coordination stereoscopic sense.

The third phase of the subject's suitability assessment consists of objective and subjective observations with the patient in the upright position both in the stationary position and during walking. These observations relate particularly to:

posture and balance;

face and neck tension, symmetry of the shoulders, trunk, scapular plane, position and rotation of the head;

eye pursuit movements independent of those of the head;

visual midline;

localisation, relationship, and spatial orientation;

linearity and stability of walking;

foot support;

fluency in the mandibular opening.

According to data collected by the patient's medical history (anamnesis) (first phase) and those resulting from the second and third phase of the assessment, the optometrist chooses the dioptric power of the prismatic lenses and their positioning, particularly angular with respect to the frame of the eyeglasses, and provides the indications and timing of use of the eyeglasses equipped with the chosen prismatic lenses. In some cases, use of these eyeglasses is integrated with rehabilitation programmes of visual function. In addition, following the interdisciplinary approach and the indications of the professionals who follow the harmony of the trigeminal way, the method using eyeglasses according to this invention may be associated with language reprogramming activities and logopedic activities in subjects with Specific Learning Disorders. The prismatic lenses, because of their shape, are designed to spread the image, by making work, besides the central part of the retina of the patient wearing the eyeglasses also the peripheral part of the retina, connected to space processing, contextualisation, and equilibrium. Particularly, the prismatic lenses, the geometry of which will be hereinafter described in detail, are adapted to activate the fibres of the peripheral areas of the retina. In other words, the prismatic lenses mounted on eyeglasses in accordance with this invention are adapted to let the patient process images in such a way as to give a new visual sensation and learning experience, as a result of which the patient changes his behavioural responses and assumes a new posture with better and correct equilibrium.

The eyeglasses 1 in accordance with this invention comprise a first prismatic lens 2, a second prismatic lens 3 and a frame 4 configured to house the first and the second prismatic lenses 2, 3. The eyeglasses 1 in addition comprise an adjustment portion 5 configured to allow mounting of the first and the second prismatic lenses 2, 3 to the frame 4 and/or the adjustment of the first and the second prismatic lenses 2, 3 relatively to the frame 4.

The frame 4 comprises a central portion 6, a first end portion 7 and a second end portion 8; the central portion 6 develops in interposition between the first and the second end portions 7, 8. The frame 4 in addition comprises a first and a second housing seats 9, 10 intended to house respectively the first and second prisms 2, 3. Preferably, the first and the second housing seats 9, 10 are defined at the central portion 6 of the frame 4. The frame 4 in addition comprises an inner portion 11 defined at the first and the second housing seat 9, 10. Under mounted condition of the eyeglasses 1, that is to say with the first and the second prismatic lenses 2, 3 housed respectively at the first and the second housing seat 9, 10, the inner portion 11 of the frame 4 is in contact with an outer perimeter portion of the first and the second prismatic lenses 2, 3 so as to hold the prismatic lenses 2, 3 in the respective housing seats 9, 10.

The frame 4 in addition comprises a front surface 40 and a rear surface 41 opposite to the front surface 40.

The frame 4 may comprise in addition a lower portion 12 and an upper portion 13 mutually opposite and longitudinally defined along a direction of the preferential development of the frame 4. Preferably, the adjustment portion 5 is defined at the upper portion 13 of the frame 4.

The frame 4 is at least partially elastically deformable, particularly at least at a portion interposed between the first and the second housing seats 9, 10; preferably, the frame 4 is elastically deformable at the central portion 6. Particularly, the frame 4 is configurable between at least one locking configuration, in which the first and the second prismatic lenses are fixed with respect to the frame, and an adjustment configuration, in which the first and the second prismatic lenses 2, 3 are movable with respect to the frame 4. To activate the frame 4 between the locking configuration and the adjustment configuration, the eyeglasses 1 comprise a regulating mechanism 14 associated with the frame 4 and configured to control the elastic deformability of the frame 4. Particularly, the regulating mechanism 14 is operatively connected to the frame 4 and can be activated between at least two positions of stability such as a first holding position and a second release position. In the first holding position the regulating mechanism 14 holds substantially the first and the second prismatic lenses 2, 3 in a fixed position with respect to the frame 4 in the locking configuration, while in the second release position, defining the adjustment configuration of the frame 4, at least one portion of the frame 4 is loose and the first and the second prismatic lenses 2, 3 are movable with respect to the frame 4.

Preferably, the regulating mechanism 14 is developed at the adjustment portion 5 of the eyeglasses 1 interposed between the first and the second housing seat 8, 9; therefore, in the mounted condition of the eyeglasses 1, the regulating mechanism 14 is developed in interposition between the first and the second prismatic lenses 2, 3. The regulating mechanism 14 can be any mechanism configured to operate the locking and the adjustment of the prismatic lenses 2, 3 and/or of the frame 4 as described above; for example, the regulating mechanism 14 may include a screw mechanism or a snap on mechanism or a spring mechanism. Preferably, the regulating mechanism comprises a screw mechanism comprising an adjustment screw 15 by means of which the regulating mechanism 14 can be actuated at least between a first holding position and a second releasing position. The adjustment screw 15 may project with respect to the upper portion 13 of the frame 4 at the adjustment portion 5, as shown for example in FIGS. 3, 4 and 6; alternatively, the adjustment screw 15 can be housed in the frame 4 in such a way as not to present, at least in the first holding position, projecting portions with respect to the upper portion 13 of the frame 4.

As regards the first and the second prismatic lenses 2, 3, they develop in interposition between the first and the second end portions 7, 8 at the central portion 6 of the frame 4. The first and the second prismatic lenses 2, 3 are yoked rotary prisms having a dioptric power, measured in prism diopters, equal for the two lenses and less than 0.25, Particularly, between 0.05 and 0.24 and/or between 0.05 and 0.20 and/or between 0.05 and 0.18, preferably between 0.07 and 0.18.

Figure 8:
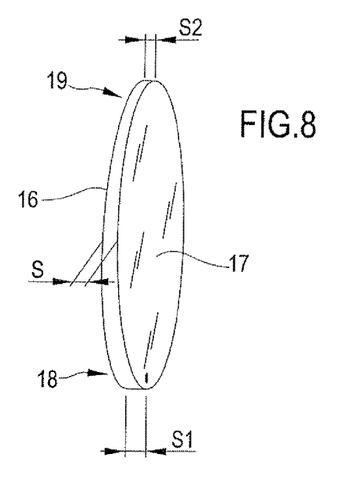
FIG. 8 shows a perspective view of a prismatic lens configured to be engaged to the eyeglasses in accordance with an embodiment of this invention.
Figure 9:
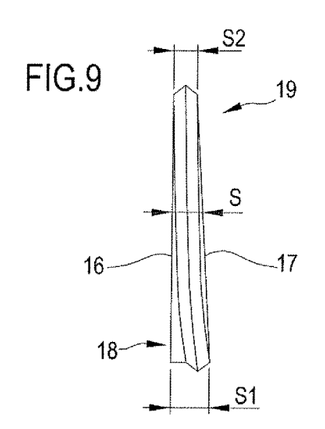
FIG. 9 shows a perspective view of a prismatic lens configured to be engaged to the eyeglasses in accordance with an embodiment of this invention.

The first and the second prismatic lenses 2, 3 have the same prismatic geometry; they have a front surface 16, a rear surface 17 and a side surface which develops circumferentially with respect to the prismatic lenses 2, 3 and which acts as a connection between the front surface 16 and the rear surface 17. The front surface 16 and the rear surface 17 of the prismatic lenses 2, 3 are mutually opposed and substantially flat and they develop on holding planes mutually non-parallel; in other words the front surface 16 and the rear surface 17 are mutually inclined, as shown in FIG. 8 and FIG. 9. In other words, since the lenses have a prismatic geometry, the first surface 16 and the second surface 17 of each lens are not mutually parallel, but rather inclined. The non-parallelism of the front surface 16 and of the rear surface 17 involves a thickness of the prismatic lenses 2, 3 not constant, as described below.

The prismatic lenses 2, 3 are characterised by a variable thickness S; particularly, the thickness S varies linearly between a first portion 18 and a second portion 19 of the prismatic lenses 2, 3. Particularly, the first portion 18 of the prismatic lenses 2, 3 is characterised by a first thickness S1 and the second portion 19 of the prismatic lenses 2, 3 is characterised by a second thickness S2; the first thickness S1 is greater than the second thickness S2. The variability of the thickness S of the lenses between a first and a second thicknesses S1, S2 gives to the lenses the prismatic shape. Preferably, in the mounted condition of the prismatic lenses 2, 3, the first portion 18 of the prismatic lenses 2, 3 is positioned at the lower portion 12 of the frame 4, while the second portion 19 of the prismatic lenses 2, 3 is positioned at the upper portion 13 of the frame 4. In other words, since the prismatic lenses 2, 3 have their portion to a greater thickness (the first portion 18) at the lower portion 12 of the frame 4 in the mounted condition of the eyeglasses 1, the prismatic lenses 2, 3 are prisms with low base, and particularly low base yoked prisms.

The thicknesses S1 and S2 are dependent on the prismatic power and the material of the prismatic lenses 2, 3, particularly by the refractive index of the material. Therefore, the thicknesses S1, S2, and/or the relative proportion, may vary depending on the material with which the prismatic lenses are made.

Advantageously, the prismatic lenses 2, 3 can be made of Polymethylmethacrylate (PMMA); preferably the prismatic lenses can be made by milling and polishing of a PMMA slab.

As regards the mounting of the prismatic lenses 2, 3 to the frame 4, the first and the second prismatic lenses 2, 3 are housed respectively at the first and second housing seats 9, 10. Preferably, the first and the second housing seats 9, 10 and the first and the second prismatic lenses 2, 3 are circular. Particularly, the first and the second prismatic lenses 2, 3 are housed rotatable at the respective housing seats 9, 10. Preferably, the prismatic lenses 2, 3 are rotatable at least in the adjustment configuration of the frame 4, while in the locking configuration of the frame 4 the prismatic lenses 2, 3 are locked in a fixed position with respect to the frame 4. The rotation of the prismatic lenses 2, 3 is preferably defined in a plane coinciding with a prevailing development plane of the prismatic lenses 2, 3 and/or with a storing plane of the front surface 16 and/or of the rear surface 17 of the first and of the second prismatic lenses 2, 3 and/or substantially orthogonal to the thickness S.

Particularly, in the adjustment configuration of the frame 4, the first and the second prismatic lenses 2, 3 are selectively rotatable between at least a first and a second angular position. In order to define the angular position of the first and the second prismatic lenses 2, 3, the first and the second lenses 2, 3 may comprise respectively a first and a second reference indicators 20, 21 of its angular position, such as a small notch, a dot, the head of an arrow, etc., at the first portion 18 of the lens at a greater thickness (or low base). Preferably, the first and the second reference indicators 20, 21 are defined at the front surface 16 or rear surface 17, respectively of the first and of the second prismatic lenses 2, 3.

Figure 10:
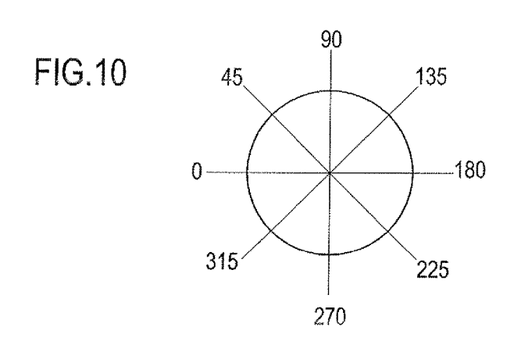
FIG. 10 shows a diagram representing a schematic view of the angular references used in this text for the definition of the angular position of the prismatic lenses.

The frame 4, in order to allow reading of the angular position of the prismatic lenses 2, 3, can comprise means for the detection of the angular position of the first and of the second prismatic lenses 2, 3, such as a first and a second graduated portions 22, 23. Preferably, the first and the second graduated portions 22, 23 are defined respectively at the first and the second housing seats 9, 10, preferably at the lower portion 12 of the frame 4. Preferably, the first and the second graduated portions 22, 23 develop at the rear surface 41 of the frame 4, as shown, for example, in FIGS. 4, 5 and 6. By means of the rotation of the prismatic lenses 2, 3, the reference indicators 20, 21 of the prismatic lenses 2, 3 are adapted to change their position relative to the first and the second graduated portions 22, 23, respectively. The rotation of the prismatic lenses 2, 3 at the respective seats with respect to the first and the second graduated portions 22, 23, respectively can vary within an angular interval of 60°, particularly of 30°. Preferably, the rotation of the prismatic lenses 2, 3 with respect to the first and the second graduated portions 22, 23, respectively can be defined in an angular range between 240° and 300°, preferably between 255° and 285°. The angular range is measured clockwise in accordance with the diagram shown in FIG. 10. Preferably, in the mounted condition of the eyeglasses 1, being the prismatic lenses yoked 2, 3, the first and the second reference indicator 20, 21 have a same angular position with respect to the first and the second graduated portions 22, 23, respectively.

Preferably, the first and the second prismatic lenses 2, 3 can have a section of the side surface with a circumferential development substantially as a "V", as shown in FIG. 9. Preferably, the section substantially as a "V" develops circumferentially with respect to the prismatic lenses 2, 3.

As regards the coupling of the prismatic lenses 2, 3 to the frame 4, it is made by housing the first and the second prismatic lenses 2, 3 respectively at the first and the second housing seats 9, 10 and by locking subsequently the lenses in the respective seats through the activation of the regulating mechanism 14. Particularly, the first and the second housing seats 9, 10 can comprise a first and a second grooved seats, configured and sized to house respectively the first and the second prismatic lenses 2, 3. Preferably, the first and the second grooved seat can develop circumferentially at the internal portion 11 of the frame 4. Particularly, the first and the second grooved seat can comprise respectively a first and a second circumferential notch. Preferably, the first and the second circumferential notch can be configured to house respectively the first and the second prismatic lenses 2, 3; particularly, the first and the second circumferential notch can be counter-shaped with respect to the section substantially as a "V" of the side surface with a circumferential development of the prismatic lenses 2, 3.

Figure 1:
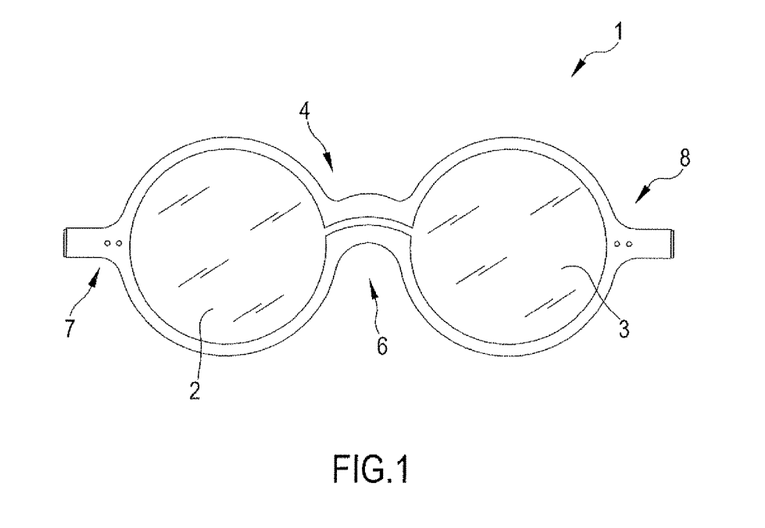
FIG. 1 shows a front view of the eyeglasses in accordance with an embodiment of this invention.
Figure 2:
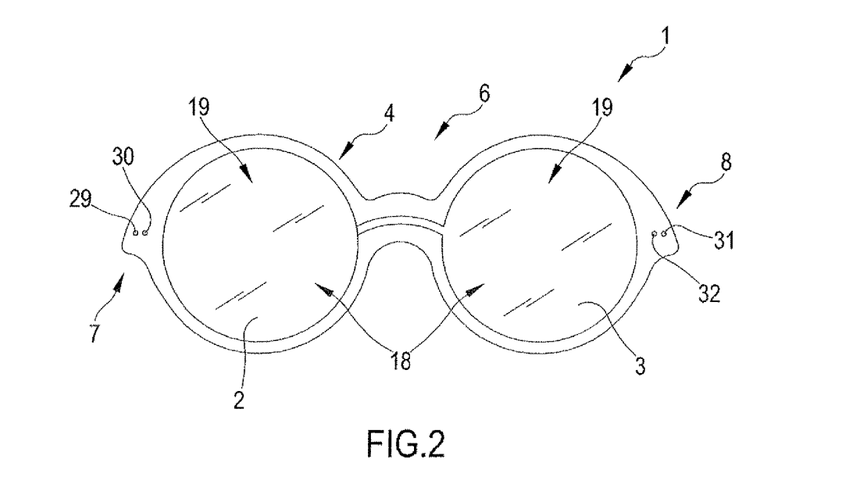
FIG. 2 shows a front view of the eyeglasses in accordance with an embodiment of this invention.
Figure 3:
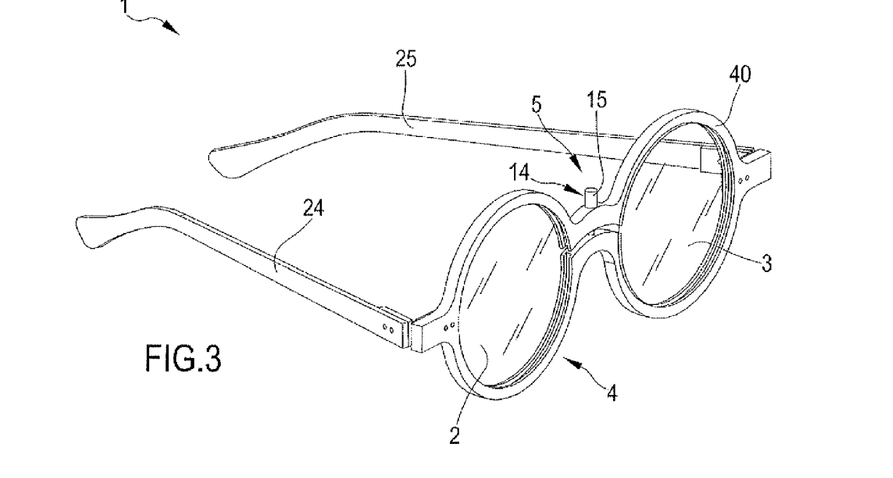
FIG. 3 shows a front perspective view of eyeglasses comprising support rods in accordance with an embodiment of this invention comprising support rods.
Figure 4:
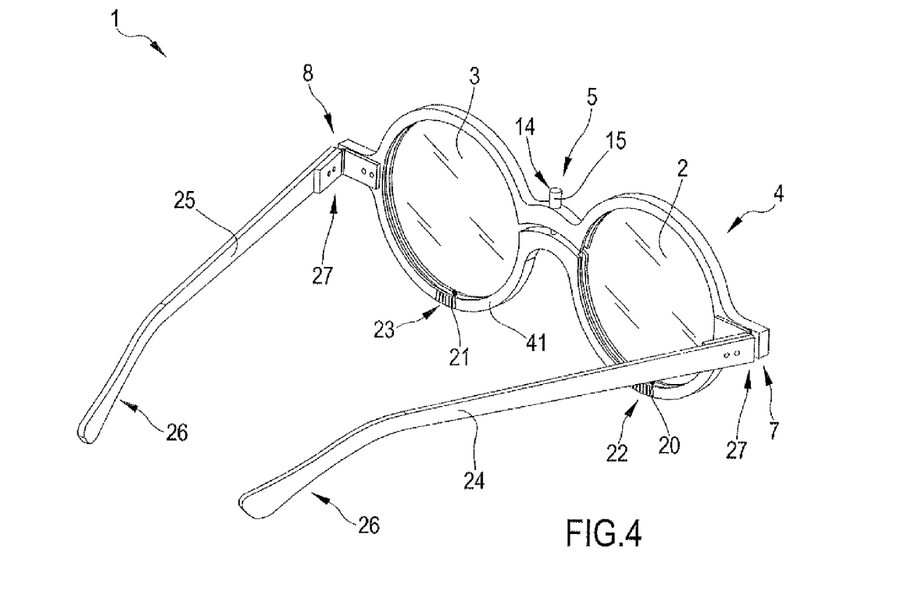
FIG. 4 shows a rear perspective view of eyeglasses comprising support rods in accordance with an embodiment of this invention comprising support rods.
Figure 5:
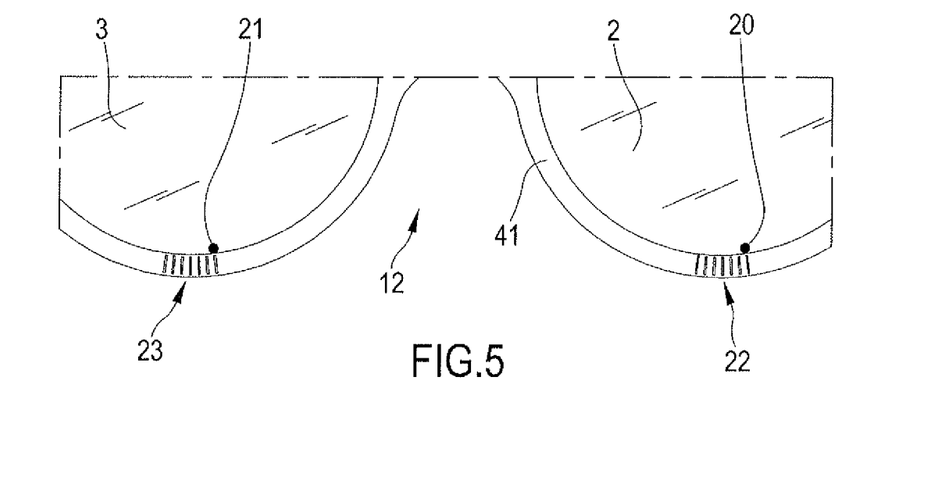
FIG. 5 shows a detailed rear view of the lower portion of the frame of the eyeglasses in accordance with an embodiment of this invention.

The eyeglasses 1 can in addition comprise a first and a second supporting rods 24, 25 operatively connected to the frame 4 respectively at the first and the second end portions 7, 8 of the frame 4. The first and the second supporting rods 24, 25 can develop in a direction substantially parallel and comprise an end portion 26 and a mounting portion 27 opposed to the end portion 26; the end portions 26 of the supporting rods 24, 25 can be at least partially curved, as shown in FIGS. 3 and 4. The first and the second supporting rods 24, 25 are operatively connected respectively to the first and the second end portions 7, 8 of the frame 4 at the respective mounting portions 27, as shown in FIG. 4. Preferably, the first and the second supporting rods 24, 25 are hinged to the frame 4 at the respective mounting portions 27.

Figure 6:
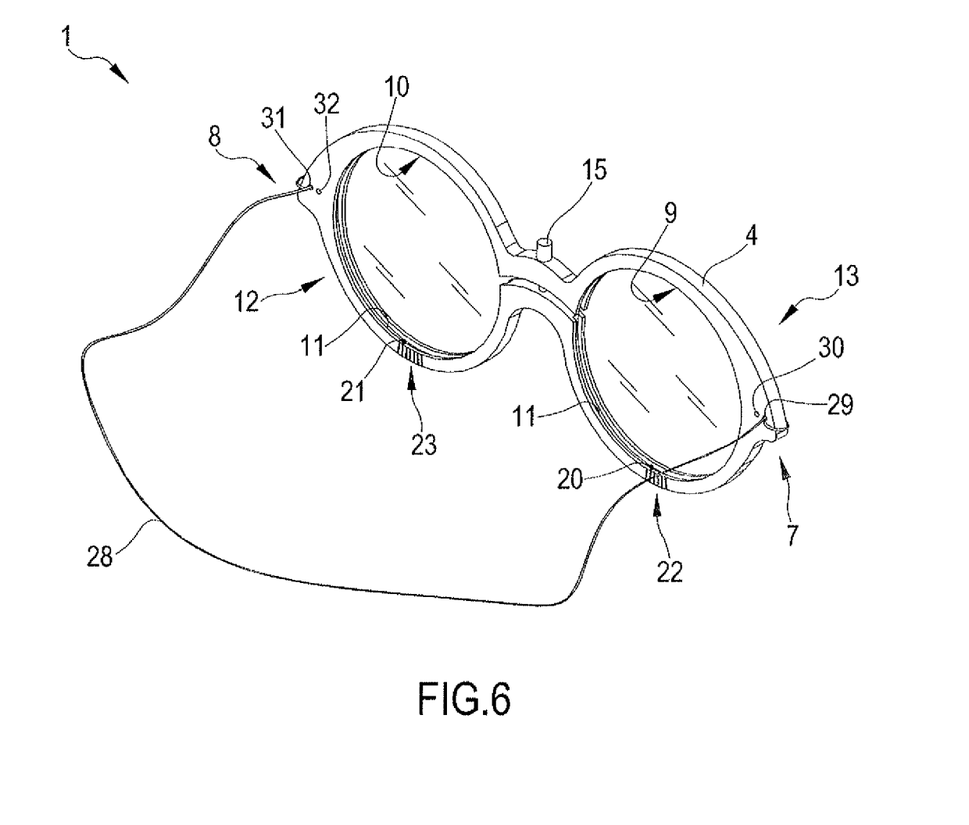
FIG. 6 shows a rear perspective view of eyeglasses comprising a joint at least partially elastic in accordance with an embodiment of this invention.
Figure 7:
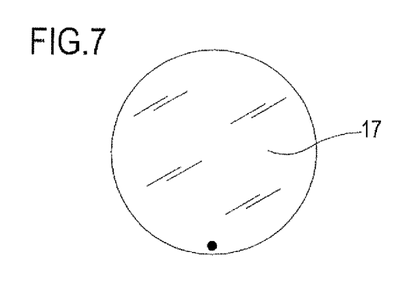
FIG. 7 shows a rear view of a prismatic lens configured to be engaged to the eyeglasses in accordance with an embodiment of this invention.

In alternative to the supporting rods 24, 25, the eyeglasses 1 can comprise a joint 28 at least partially elastic operatively connected to the frame 4, as shown in FIG. 6. The frame 4 can comprise one or more openings configured to house the joint 28. Preferably, the joint 28 is housed at least at a first opening 29, 30 and at least at a second opening 31, 32 of the frame 4. The first openings 29, 30 and the second openings 31, 32 are defined respectively at the first and at the second end portion 7, 8 of the frame 4, as shown in FIG. 6. Particularly, the joint 28 can be engaged at both the first openings 29, 30 at the first end portion 7 and at both the second openings 31, 32 at the second end portion 8.

The eyeglasses 1 in accordance with this invention can be configured and sized to be worn by children and adults, and can be manufactured in different measures for this purpose.

This invention further relates to the use of the eyeglasses 1 for visual-perceptual and/or postural rehabilitation in harmony with the trigeminal way of a patient.

This invention allows to obtain one or more of the following advantages and solve one or more of the problems met in the prior art. First of all, the eyeglasses in accordance with this invention do not involve side effects in patients who wear them. Furthermore, the invention enables to destructuring muscular tensions, rehabilitate and reprogramme visual dysfunctions and postural defects even of slight entity and/or to act in patients rigidly organised, by improving the sensory modalities of relation among the various muscular systems from the oculomotor to balance the unique relation between eyes, teeth and posture.

The beneficial effects are found subjectively and objectively after a few minutes that the eyeglasses are worn in accordance with this invention.

The invention is applicable to any patient and age, in children aged 2 years and a half; in addition, it proves to be of convenient use, easy to implement and of simple and economical manufacture.

The invention claimed is:

1. An eyeglass for visual perceptual and/or postural rehabilitation, the eyeglass comprising:
   a first prismatic lens and a second prismatic lens, and
   a frame configured to support the first and second prismatic lenses,
   wherein the first and second prismatic lenses being yoked prisms having a dioptric power, measured in prism diopters, that is equal for the first and second prismatic lenses and in a range of 0.05 and 0.24.

2. The eyeglass according to claim 1, wherein the frame is configurable between at least one locked configuration at which the first and second prismatic lenses are fixed with respect to the frame, and an adjustment configuration at which the first and second prismatic lenses are movable with respect to the frame.

3. The eyeglass according to claim 2 further comprising:
   an adjustment mechanism associated with the frame and having at least two stability positions, wherein the adjustment mechanism being operable between at least a first holding position in which the first and the second prismatic lenses are held in a fixed position with respect to the frame in a locked configuration, and a second release position, defining an adjustment configuration of the frame, in which at least one portion of the frame is loosened and the first and second prismatic lenses are movable with respect to the frame and/or wherein a regulating mechanism develops at an adjustment portion of the eyeglasses interposed between the first and second prismatic lenses.

4. The eyeglass according to claim 3, wherein in the adjustment configuration, the first and second prismatic lenses are selectively rotatable between at least a first angular position and a second angular position, wherein the rotation being defined in a plane coinciding with a primary development plane of the prismatic lenses and/or with a resting plane of at least one between a front surface and a rear surface of the first and second prismatic lenses and/or substantially perpendicular to the thickness.

5. The eyeglass according to claim 1, wherein at least one portion of the frame is elastically deformable and/or wherein the elastic deformation of the at least one portion of the frame is controlled by an adjustment mechanism.

6. The eyeglass according to claim 1, wherein the first and second prismatic lenses, respectively, have a first reference indicator and a second reference indicator configured to indicate an angular position thereof and/or wherein the frame has identification indicator configured to indicate the angular position of the first and second prismatic lenses.

7. The eyeglass according to claim 6, wherein the identification indicator of the angular position of the first and second prismatic lenses, respectively, comprises a first and a second graduated portion and/or wherein the first and second graduated portions are defined at a lower portion of the frame and define an angular interval less than or equal to sixty degrees and/or wherein the first and the second reference indicators respectively have the same angular position with respect to the first and second graduated portions.

8. The eyeglass according to claim 1, wherein the frame includes a lower portion and an upper portion, and
wherein the first and second prismatic lenses have a variable thickness, wherein the variable thickness varies between a first thickness defined at a first portion of the prismatic, lenses located at the lower portion of the frame and a second thickness defined at a second portion of the prismatic lenses located at the upper portion of the frame,
wherein the first thickness is greater than the second thickness.

9. An eyeglass for visual-perceptual and/or postural rehabilitation, comprising:
a first prismatic lens and a second prismatic lens, and
a frame configured to support the first and second prismatic lenses,
wherein the frame includes a lower portion and an upper portion, and wherein the first and second prismatic lenses have a variable thickness, wherein the variable thickness varies between a first thickness defined at a first portion of the prismatic lenses located at a lower portion of the frame and a second thickness defined at a second portion of the prismatic lenses located at the upper portion of the frame, wherein the first thickness is greater than the second thickness;
wherein the first and second prismatic lenses are yoked prisms having a dioptric power, measured in prism diopters that is equal for the first and second prismatic lenses and less than 0.25.

10. A method for visual-perceptual and/or postural rehabilitation, comprising wearing eyeglasses comprising a first prismatic lens and a second prismatic lens, wherein the first and second prismatic lenses are yoked prisms having a dioptric power, measured in prism diopters that is equal for the first and second prismatic lenses and less than 0.25.

* * * * *